United States Patent

[11] 3,614,365

| [72] | Inventor | Alan B. Lane |
|---|---|---|
| | | Northridge, Calif. |
| [21] | Appl. No. | 870,891 |
| [22] | Filed | Sept. 19, 1969 |
| [23] | | Division of Ser. No. 646,008, June 14, 1967, abandoned |
| [45] | Patented | Oct. 19, 1971 |
| [73] | Assignee | Hunt-Wesson Foods, Inc. |
| | | Fullerton, Calif. |

[54] APPARATUS FOR COOKING BACON AND OTHER MEAT PRODUCTS BY MICROWAVE ENERGY
2 Claims, 1 Drawing Fig.

[52] U.S. Cl. .................................... 219/10.55,
219/10.49, 219/10.79
[51] Int. Cl. .................................... H05b 4/06,
H05b 5/00

[50] Field of Search .................................... 219/10.71,
10.55, 10.47; 99/107, 221

[56] References Cited
UNITED STATES PATENTS

| 2,807,550 | 9/1957 | Zarotschenzeff et al. | 99/174 |
| 3,263,052 | 7/1966 | Jeppson et al. | 219/10.55 |
| 3,321,314 | 5/1967 | Jeppson | 219/10.55 X |
| 3,409,447 | 11/1968 | Jeppson | 219/10.55 |
| 3,478,900 | 11/1969 | Jeppson | 219/10.55 |

Primary Examiner—J. V. Truhe
Assistant Examiner—L. H. Bender
Attorney—I. Morley Drucker ABSTRACT: Apparatus for cooking cold or refrigerated bacon and other meat products comprising means for preheating the bacon by means, other than by microwave energy, to a temperature above about 60° F. and preferably below about 90° F. and thereafter further heating the meat product, in a microwave, energy zone until it is properly cooked.

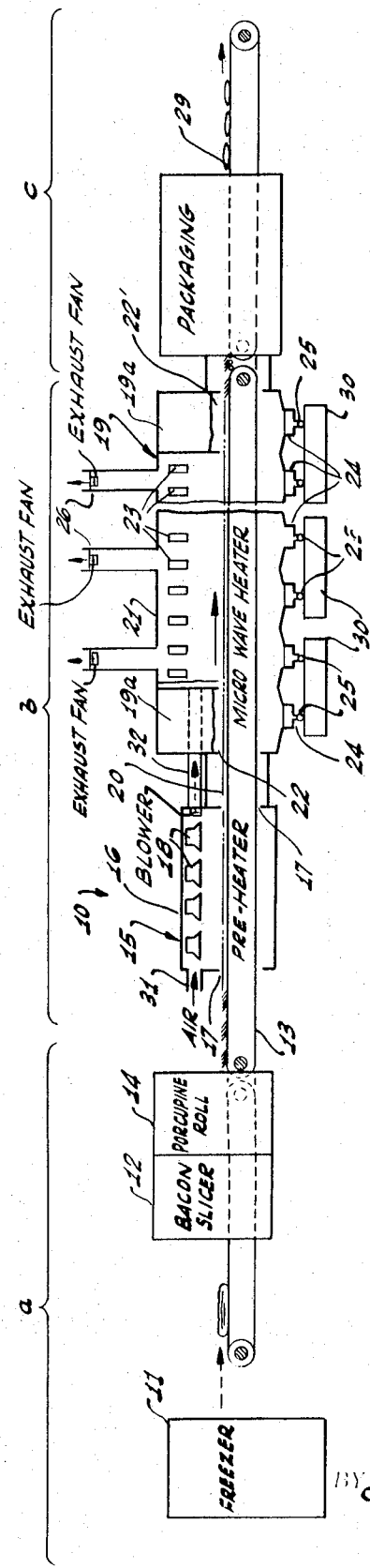

3,614,365

APPARATUS FOR COOKING BACON AND OTHER MEAT PRODUCTS BY MICROWAVE ENERGY

CROSS-REFERENCES TO RELATED APPLICATIONS

This application is a divisional application of Ser. No. 646,008 filed June 14, 1967 and entitled "Process for Cooking Bacon and Other Meat Products by Microwave Energy," Ser. No. 646,008 now being abandoned.

BACKGROUND OF THE INVENTION

This invention relates broadly to food processing and, more particularly, to a method and means for cooking bacon and other meat products by microwave energy.

Conventionally, cooking of meats has been accomplished by heating the foods using, for example, open fires, electricity and gas. The disadvantage of each of these sources of heat is that the meat is heated unevenly. That is, because of the relatively low thermal conductivity of meats, the portion of the meat which is exposed to the heat source will be heated to a substantially higher temperature (in the same time) than portions of the meat which are not exposed directly to the heat source. Therefore, parts of the meat may be burned while other parts of the meat remain uncooked.

In recent years, a new heating method has been developed to overcome the foregoing disadvantages of conventional heating methods. This new method employs microwave energy which is energy having wavelengths below about 30 cm. The principle of microwave heating stems from a rubbing together of the molecules within a product through which the microwaves pass. The molecules in the product—acting like miniature magnets—attempt to align themselves with the electrical field of the microwaves passing through it. From the action of the swiftly moving molecules, heat is created, just as in the old principle of rubbing two sticks together to start a campfire. The principle characteristic of microwave heating is that all portions of the food are cooked simultaneously.

In spite of the advantages of microwave cooking, this cooking method has not been successfully utilized heretofore, to the best of our knowledge, for the precooking of cold or refrigerated bacon for the following reasons. When cold or refrigerated bacon is cooked by microwaves, the bacon is reduced unevenly and tends to "blossom" or wrinkle in a characteristic rosette pattern. Bacon which has "blossomed" is not readily marketable because it is not a esthetically pleasing. Additionally, because the bacon slices are reduced unevenly, the bacon product cannot be packaged by automatic or semiautomatic packaging means. Furthermore, when bacon slices are shingled, that is, partially overlayed to permit more compact packaging, microwave heating causes the protein portions of the bacon strips to anneal to each other making it very difficult to separate the shingled strips.

SUMMARY

Because of the rapid pace of modern society, "convenience" foods have achieved a ready market. Many foods are precooked so that the consumer only has to reheat the food for a short time, e.g., a few minutes or less to make the food palatable. To this end, it is a principal object of this invention to utilize microwave energy to produce precooked bacon and other meat products which have a good appearance and which is evenly cooked, and to avoid the problems heretofore through inherent in cooking with microwave energy.

This object is accomplished by heating bacon or other meat products (which are normally stored at or below 32° F.) by conventional heating methods, e.g., infrared heating to a temperature above about 60° F. and preferably below 90° F. prior to cooking of the bacon by microwave heating. This combination of conventionally heating cold or refrigerated bacon within a particular temperature limits and then immediately further heating the bacon by microwave energy, produces a precooked bacon product which is uniform in size and which is uniformly cooked. Additionally, the cooked bacon is aesthetically pleasing and easily lends itself to automatic or semiautomatic packaging methods.

DESCRIPTION OF THE DRAWINGS

The single FIG. shows schematically and, in side elevation, the component parts of the apparatus of this invention.

DESCRIPTION OF THE PREFERRED EMBODIMENT

In general, this invention comprises a method and means for cooking bacon (which has been stored at temperatures, substantially below ambient) or other meat products comprising (a) raising the temperature of the meat product above a specific temperature by any suitable heating method other than by microwave heating, (b) introducing the meat product at a temperature above this specific temperature into a microwave oven and (c) cooking the meat product with microwaves until it is cooked a desired amount. More specifically, in the preferred embodiment, the meat product is preheated by infrared heating to an average temperature of above about 60° F. and preferably below about an average temperature of 90° F., transferred at this slightly elevated temperature into a microwave oven and then cooked, by microwaves, for a predetermined time.

The average temperature of an individual bacon slice is determined by measuring the temperature of both the fat and lean portions of an individual bacon slice, by suitable means, such as by means of thermocouple probes set into the slice a predetermined distance from the surface of the slice. The temperature variation between fat and lean portions of an individual slice may vary as much as 25°–35° F. Thus, if the lean portion measures 50° F. and the fat portion 75° F., the average temperature of the bacon slice is 62.5° F. for the purposes of this specification and claims.

The average temperature of other meat products such as sausage, hamburger, pork and ham is much more uniform within an individual piece.

The result of cooking bacon which has been held at temperatures substantially below ambient by the herein described combination of conventional (nonmicrowave) heating and microwave heating, is the production of evenly cooked, aesthetically pleasing bacon. The cooked bacon so produced is substantially uniform in size and is capable of being easily and economically packaged. Additionally, a fat product is produced which is clean and clear in appearance and which can be sold without extensive filtering. Sale of this fat by product substantially reduces the unit cost of the process of this invention.

The reason for the differences in the bacon product when the bacon is cooked solely by microwave heating as compared to cooking bacon by the combination of conventionally heating the bacon above about 60° F. and thereafter cooking the bacon with microwave energy is not presently completely understood. However, experiments have shown that the bacon product produced by a combination of microwave and conventional heating (preheating above about an average temperature of 60° F.) is substantially superior to the product produced solely by microwave heating bacon initially at temperatures below about an average temperature of 60° F.

Experiments have shown that the undesirable results produced when cold or refrigerated bacon is cooked solely by microwaves are produced early in the microwave cooking period. That is, in about the first 15 seconds of microwave cooking, the bacon begins to "blossom" and to nonuniformly reduce in size. After substantial experimentation, it was found that "blossoming" is completely avoided by heating the bacon by conventional means above 60° F. prior to its subjection to microwave heating.

Conventional heating of bacon after it has been heated solely by microwaves will not eliminate the undesirable effects produced by the prior microwave cooking. Also, cooking cold or refrigerated bacon with a simultaneous combination of microwave and conventional heating means almost invariably produces a "blossoming" of the bacon, as heretofore mentioned.

In addition to preheating the bacon by conventional means (as opposed to post—or simultaneous heating) it has been experimentally determined that the bacon must be brought up to at least a minimum average temperature. This minimum average temperature has been determined to be about 60° F. As mentioned, this minimum temperature is an average minimum temperature established by averaging the temperatures of the fat and lean areas of individual bacon slices by means of probes attached to thermocouples.

To determine the average temperature to which the bacon must be conventionally preheated, frozen bacon slices were permitted to thaw for varying periods in ambient atmosphere (70° F.) to provide a series of bacon slices at various temperatures as shown in table I. Each bacon slice was then introduced, at the temperature to which it had been raised, into a microwave oven and cooked at a predetermined power setting for a predetermined time, the microwave power setting and cooking time being the same for each slice of bacon. Following the microwave cooking, the bacon slices were removed from the microwave oven and their weight loss was determined and their appearance observed. The data and observations from these tests are shown in table I.

TABLE I

| Test No. | Bacon temp. (° F.) | | Microwave heating time (sec.) | Bacon weight (gm.) | | Observations of cooked Bacon |
|---|---|---|---|---|---|---|
| | Initial | Preheat* | | Initial | After cooking | |
| 1 | 32 | 35 | 105 | 56 | 21 | Severe curling and annealing. |
| 2 | 32 | 35 | 105 | 55 | 21 | Do. |
| 3 | 32 | 40 | 105 | 58 | 21 | Do. |
| 4 | 32 | 40 | 100 | 57 | 25 | Do. |
| 5 | 32 | 45 | 100 | 55 | 19 | Do. |
| 6 | 32 | 45 | 100 | 50 | 20 | Moderate curling and annealing. |
| 7 | 32 | 50 | 100 | 51 | 18 | Do. |
| 8 | 32 | 50 | 100 | 55 | 18 | Do. |
| 9 | 32 | 55 | 98 | 54 | 19 | Do. |
| 10 | 32 | 55 | 98 | 56 | 20 | Do. |
| 11 | 32 | 60 | 98 | 57 | 18 | Slight curling and annealing. |
| 12 | 32 | 60 | 95 | 57 | 18 | Do. |
| 13 | 32 | 65 | 90 | 54 | 16 | Do. |
| 14 | 32 | 65 | 85 | 51 | 17 | Do. |

*Average temperature of fat and lean areas.

As will be noted from table I, the appearance of the bacon (shape, conformity, curling) improves markedly as the temperature to which the bacon is initially raised increases. Below about 60° F., the bacon slices are characterized by too much curling, annealing, and lack of shape uniformity to be readily marketable. Above about 60° F., the bacon slices after cooking by microwave energy are substantially uniform in size and are aesthetically pleasing in appearance. Because there is substantial variation in bacon slices initially, for example, in the ratio of fat to lean portions, it is preferable to preheat the bacon slices to an average temperature of about 65° F. to provide a margin of safety so that substantially all bacon slices will be cooked as desired.

As will also be noted from table I, the microwave heating time required to reduce the initial weight of the bacon by a particular fraction decreases markedly as the temperature of the preheated bacon increase. For example, at a preheat temperature of 35° F., 105 seconds are required to reduce the bacon to a weight of about 37.5 percent of the initial weight. This is to be compared with the 87.5 seconds (avg.) required to reduce bacon preheated to 65° F. to 31.5 percent (avg.) of its initial weight. Thus, as the preheat temperature is increased, the time and therefore the energy requirements and cost required for the microwave heating phase decreases. The result is that preheating the bacon above about 65° F. makes for an overall more economical process. However, it has been found that to produce aesthetically appealing precooked bacon most economically it is preferable not to preheat the bacon to temperatures above about 80° F. This is because the microwave phase of the cooking process heats the bacon due to energy supplied the water molecules in the bacon by the microwaves. This heating of the bacon by the microwaves, of course, raises the temperature of the bacon. Since microwave cooking of bacon is always accompanied by a bacon temperature increase, it is economically unnecessary to preheat the bacon above about 80° F.

This same heating of the bacon by the microwaves occurs with bacon at less than 60° F. However, the temperature rise due to the microwave energy is not sufficiently rapid so that the bacon is "cooked" before its temperature has sufficiently increased. The result then is nonuniform badly curled bacon slices which are unsuitable for sale.

A further advantage is obtained by preheating the bacon to temperatures below about 80° F. At such temperatures, the fat portion of the bacon slices remains solid. Therefore, no liquids or vapors are given off by the bacon with the result that all of the fat byproduct can be and is removed from the microwave ovens. Spattering or fogging of, for example, the infrared lamps, ceramic quartz elements or other elements used in the preheating phase is also eliminated thereby ensuring maximum efficiency. Additionally, fire hazards are avoided by the elimination of spattering of fat. If it is desired to preheat the bacon to temperatures above 80° F., it is preferable not to go above 90° F. since significant amounts of the fat begin to melt above this temperature with attendant coating of the heat lamps which lowers heating efficiency and greater possibilities of fire due to spattering of fat. Thus, the fat which is removed from the bacon in the combination conventional-microwave heating process of this invention is of a very high quality and is saleable without extensive treatment. Furthermore, because substantially no fat is lost due to burning or scorching, a maximum amount of fat byproduct is recovered thereby further reducing process costs.

During the preheating, temperature gradients are induced in the bacon slices at all temperatures because of the insulative characteristics of bacon. Such temperature gradients are maintained in the bacon during the microwave heating cycle. Below about an average bacon temperature of about 90° F., these temperature gradients are sufficiently small so that the entire bacon slices are cooked substantially evenly. However, at temperatures about 90° F., the temperature gradients become significantly large so that the bacon is cooked unevenly in the microwave unit. That is, some parts of the bacon remain in an uncooked condition while other parts of the same bacon may be overcooked.

The foregoing heating of the bacon may be accomplished by employing, in combination with a microwave heater, ambient air or a preheater to preheat the bacon to a temperature above about 60° F., and preferably below about 80° F. Because the bacon is generally maintained in a frozen state and because warming by ambient air is too slow, it is preferable to employ a preheating chamber or preheater in combination with a microwave heater.

After the bacon is preheated, it is then cooked in a microwave oven until the bacon reaches a desired consistency. In the microwave oven, the bacon is heated to above about 212° F. and as high as 250° F. Substantially all of that portion of the bacon which is removed to produce the final bacon product is removed during microwave heating. About 60–70 percent of the weight of the original bacon weight is removed.

Other meat products such as sausage, hamburger, or ham are advantageously precooked in the process of this invention as well. In the process of sausage, hamburger and ham, a preheat, by infrared or other nonmicrowave means, to between about 60–90° F. is employed as described with reference to bacon. Thereafter, the preheated meat is cooked by microwave energy until between about 15-40 percent of the initial weight of products such as hamburger and sausage is lost, and until between about 15-30 percent of the initial weight of the ham is lost. In general, the amount of weight loss of meat products processed in accordance with this invention lies between about 15 percent and 70 percent.

A typical process line, incorporating the combination of a preheater and a microwave heater for performing the process of this invention with reference to bacon will now be described. In the FIG., the numeral 10 designates a bacon processing line incorporating a bacon preparation section a, a cooking section b and a packaging section c. The bacon which is generally stored in bellies in a freezer 11 at between about 27°-32° F. is transferred to a conventional slicer 12 which slices the frozen bacon bellies into slices of desired thickness. To reduce packaging costs, the bacon bellies are preferably sliced in a timing sequence which produces a plurality of slices of bacon in each sequence and, simultaneously, partially overlays or shingles the bacon slices in each such sequence. The number of slices in each group may be varied considerably, for example, the bacon may be packaged in groups of three to 30 or more.

The sliced bacon, whether individual slices or in a shingled mode as described, is transferred to a conveyor 13 which carries the bacon through the various heating chambers. Such transfer may be accomplished by any suitable conventional means such as, for example, a porcupine roller 14. To provide the most efficient heating of the bacon in the heating chambers, the conveyor 13 is preferably made of a nonconductive material capable of withstanding moderately high temperatures, e.g., up to 400° F. A suitable material from which the conveyor may be made is silicon rubber.

The shingled bacon is next carried by the conveyor 13 into a preheater 15. Upon entry into the preheater 15, the bacon has generally risen about 2°-4° F. above its refrigeration temperature, that is, the bacon is at a temperature of about 32°-34° F. The speed of the conveyor 13 is adjusted so that the bacon is brought up to a temperature of at least, about 60° F. and preferably below about 80° F. when the bacon exits from the preheater 15.

The preheater 15 comprises an insulated housing 16 having a pair of openings 17 in opposing ends through which the bacon enters and exits on the conveyor 13. The interior of the housing 16 carries a plurality of heaters 18 disposed in a predetermined pattern to most efficiently warm the bacon strips. The heaters 18 may be any conventional type, for example, ceramic or quartz lamp heaters.

After passing through the preheater 15, the bacon is carried by the conveyor 13 into a microwave oven 19 including microwave traps 19a at each end thereof. Preferably, the heat lost by the bacon as it passes from the preheater 15 to the microwave oven 19 is minimized so that only a minimum amount of microwave energy need be used to completely cook the bacon. Minimization of this heat loss may be accomplished by, for example, connecting the preheater 15 and microwave oven 19 by an insulated duct 20.

The microwave oven 19 comprises an oven housing 21 having a pair of apertures 22, 22' in opposing walls of the housing to permit entrance and egress, respectively, of the bacon on the conveyor 13. The oven housing 21 supports a plurality of modular units 23 which produce a certain amount of microwave energy sufficient to cook a predetermined quantity of bacon per hour. The bottom portion of the microwave oven housing is sloped to form a plurality of tapered collection troughs 24 having apertures 25 in the bottoms thereof for discharging the liquid fat rendered from the bacon slices into collectors 30.

To facilitate collection of the fat it is preferable that the conveyor belt be formed of a material provided with openings so that the liquid fat can flow downward through the interstices in the belt and into the collection troughs 24. The conveyor belt 13 carrying the bacon through the microwave oven may be made of any material which is compatible with microwaves, that is, which is not affected by the microwaves. Such a material is silicon rubber and, since silicon rubber is a desirable material for the conveyor belt for carrying the bacon through the preheater 15, a single conveyor belt may be employed to transport the bacon through the heating section b.

The microwave oven 19 also contains discharge ducts 26 in the roof of the oven housing 21 for conducting away substantial amounts of the water vapor which are produced from the water contained in the bacon when the bacon is subjected to the microwaves. These discharge ducts are preferably located above the location within the microwave oven 19 at which the largest amounts of water vapor are produced, that is, near the microwave oven entrance 22.

The microwaves emitted by the modular units pass through waveguides (not shown) which guide the microwaves into directional streams. Bacon which is irradiated by microwaves from the center of these streams will usually be cooked before bacon which is irradiated by microwaves at the periphery of these streams. Therefore, it is preferable to incorporate a means for deflecting or stirring the microwaves so that all of the bacon is subjected to substantially the same quantity of microwave energy in the same time. This may be accomplished by employing spinners or electronic stirrers in conjunction with the waveguides to break up the substantially unidirectional flow provided by the waveguiders.

Because the meat products invariably contain substantial amounts of water, and because the presence of water vapors in the microwave heating zone of the process would cause great inefficiencies in heating by microwave energy, provision has been made for removal of water vapors produced in microwave oven 19 as follows: air is introduced into preheater section 15, via pipe 30, and is directed over the heated lamps or other elements 16. The air is thereby heated in its passage through preheater 15. The heated air is then directed, through pipe 32 into microwave oven 19, and passes through the oven picking up water vapors residing therein and exiting via exhaust pipes 26. The just-described means provides a simple and efficient mode of ridding the atmosphere within the microwave cooking section of water vapors.

After being subjected to microwave heating in the microwave oven 19, the bacon exits on the conveyor 13 from the oven at a temperature of about 200° F. At this stage, approximately 60-70 percent of the weight of each bacon slice has been removed, principally as fat and water. For example, a shingled mode comprising four slices of bacon in shingled relation and having dimensions of 9.5 to 10 inches by 3.5 inches prior to its introduction into the preheater, has dimensions of about 5.5 to 6 inches by 2.5 inches as it exits from the microwave oven.

The cooked bacon is next preferably transferred to another conveyor 29 which transports the cooked bacon to the packaging section c. Here the bacon is preferably packaged in shingled groups of anywhere from three to 30 bacon slices in foil envelopes such as described in copending application entitled "Improved Food Package" Ser. No. 506,349 filed Nov. 4, 1965 and assigned to the instant assignee.

Modifications of the herein described process and apparatus may be made by those skilled in the art without departing from the spirit of the invention. Therefore, the scope of this invention is to be limited only by the appended claims.

I claim:

1. Apparatus for cooking a meat product, which is normally stored below about 32° F., by microwave energy, comprising:
   a preheater, for preheating said meat products, containing energy means, other than by microwave energy, followed by a microwave oven containing microwave units, for irradiating said meat product with microwave energy, to produce a cooked meat product and water vapor;
   means for conducting heated air from said preheater into said microwave oven whereby to remove said water vapor from said microwave oven; and
   conveyor means passing through said preheater and then through said microwave oven.

2. Apparatus of claim 1 wherein said preheater energy means is an infrared heater.